May 5, 1970  R. P. DYE  3,509,789
SOD-CUTTING APPARATUS

Filed Dec. 4, 1967  3 Sheets-Sheet 1

INVENTOR
ROBERT P. DYE
BY
Cohn and Powell
ATTORNEYS

INVENTOR
ROBERT P. DYE
BY
Cohn and Powell
ATTORNEYS

May 5, 1970 R. P. DYE 3,509,789
SOD-CUTTING APPARATUS

Filed Dec. 4, 1967 3 Sheets-Sheet 3

INVENTOR
ROBERT P. DYE
BY
Cohn and Powell
ATTORNEYS

United States Patent Office 3,509,789
Patented May 5, 1970

3,509,789
SOD-CUTTING APPARATUS
Robert P. Dye, 12076 Bellefontaine Road,
St. Louis, Mo. 63138
Filed Dec. 4, 1967, Ser. No. 687,837
Int. Cl. B26d 1/30, 7/02, 5/12
U.S. Cl. 83—145                                             13 Claims

ABSTRACT OF THE DISCLOSURE

The apparatus includes a table provided with a cutter board which supports a block of sod, and provided with guides which position the cutter board. A support arm, hingedly attached to the table at one end, includes a plurality of spaced cutting blades at the other end and disposed above the block of sod. The support arm is moved toward or away from the table by means of a hydraulic reciprocating arm. A stripper assembly, overlying the sod and including a plurality of slots in register with the blades, is disposed in the path of the blades. The blades pass through the slots to cut the sod when the blades are moved toward the table. The stripper assembly cooperates with the blades to strip sod from the blades as they move away from the table. The stripper assembly is hingedly attached at one end to the table, and is provided at the other end with a latch interconnecting it to the table to clamp the sod in position. Interchangeable spacer blocks between the cutting blades permit a variation in the size of the plug cut from the sod.

Background of the invention

This invention relates generally to a sod-cutting machine, and more particularly to a machine which utilizes only one set of blades to accomplish the cutting of the sod in two directions to form plugs.

One of the difficulties experienced in cutting sod is that the sod, when cut, tends to adhere to the blades of the cutting head and impair the efficiency of the machine. This problem has led to the use of somewhat elaborate machines utilizing disc type blades. Typical of this type of sod cutter is a machine which relies on gravity feed and utilizes at least one set of disc cutters in addition to a set of linear blades. In this type of machine, the sod is fed vertically to a vertical chute, horizontal cuts are made by the linear blades and vertical cuts are made by disc blades.

The present sod-cutting machine does not require that the sod be fed into the machine in a vertical position but, on the contrary, works efficiently to cut the sod in two directions while the sod is maintained in a horizontal position. Further, the machine utilizes a cutter board which makes it possible to turn the sod rapidly for criss-cross cuts. The cutter board is particularly convenient for manual handling of the sod to be cut, both before and after individual plugs have been prepared.

The provision of a stripper assembly not only insures that the sod will not adhere to the blades after the cutting action but, in addition, provides a clamp for holding the sod in position during the cutting action. The stripper assembly also includes a safety latch which precludes unintentional operational movement of the cutting mechanism during sod handling by an operator.

Summary of the invention

The sod-cutting apparatus includes a table adapted to receive a block of sod, and a plurality of cutting blades selectively disposed in spaced relation to the table and selectively movable toward or away from the table.

A stripping means is provided which is adapted to overlie the block of sod in the path of the blades. The stripping means includes a plurality of slots in register with the blades, the slots receiving the blades as they move toward the table to cut the sod. The stripping means strips sod from the blades as they move out of the slots and away from the table.

A cutter board is provided which is adapted to support the sod upon the table. Guide means on the table provides stops which position the cutter board in two locations substantially 90° out of phase with each other.

Spacer blocks separate the blades in substantially spaced parallel relation, the spacer blocks determining the size of the plug cut from the block of sod.

A latch interconnects the table and the stripping means to retain the stripping means during the stripping action as the blades move upwardly. The latch activates a safety switch, operationally connected by circuitry to power means moving the blades, which precludes movement of the blades until the latch interconnects the table means and the stripping means.

A support arm is provided, pivotally mounted to the table. The support arm includes an outer end on which the blades are mounted. A reciprocating arm is connected to the support arm between the support arm pivotal mounting and the blades. A support frame provides a connection for the other end of the reciprocating arm.

The stripping means includes a pair of oppositely disposed ends overhanging the sod, one end being hingedly attached to the table. A latch carried by the other end interconnects the table and the stripping means to clamp the sod to the table during the cutting action.

Description of the preferred embodiment

Figure 1:
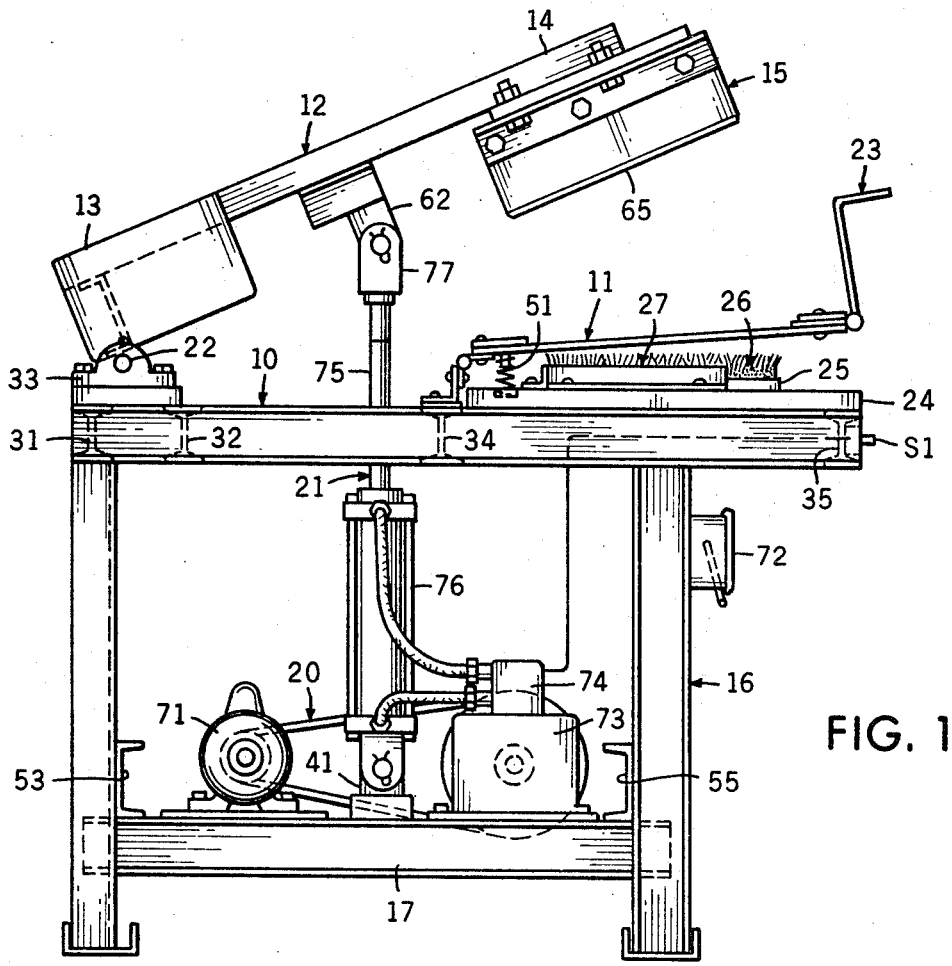
FIG. 1 is a side elevational view of the sod-cutting apparatus with the blades in a non-cutting position.
Figure 2:
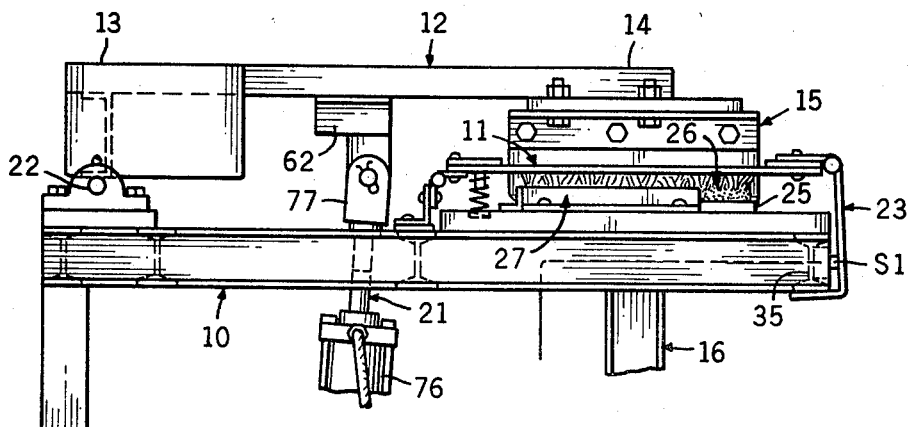
FIG. 2 is a fragmentary view of the table portion of the apparatus showing the blades in a cutting position.

Referring now by characters of reference to the drawings, and first to FIG. 1, it will be understood that the sod-cutting apparatus includes a table assembly 10 constituting a table means, and a stripper assembly 11 constituting a stripping means.

A support arm 12 including an inner end 13 and an outer end 14 is pivotally mounted at its inner end 13 to the table assembly 10. At its outer end 14, the support arm 12 carries a blade assembly 15.

The table assembly 10 is carried by a support frame 16. The support frame 16 includes a cross beam 17 carrying the drive mechanism generally indicated by numeral 20.

A reciprocating arm 21 extends between the support arm 12 and the cross beam 17 to provide a means selectively moving the support arm 12 in oscillatory motion about the pivotal connection 22 which produces a movement of the blade assembly 15 toward or away from the table assembly 10.

A substantially L-shaped latch member 23 which is hingedly attached to the stripper assembly 11 provides a means of interconnecting the stripper assembly 11 and the table assembly 10, the latch member 23 being removably interconnectable to the underside of the table assembly 10 in hooked relation.

The table assembly 10 includes a base member 24 which carries a cutter board 25. The cutter board 25 is a removable portion of the table assembly 10 and carries the block of sod 26 which is to be cut into plugs.

A guide means 27 provides a stop means cooperating with the cutter board to position it in two locations, substantially at 90° out of phase with each other.

Figure 5:
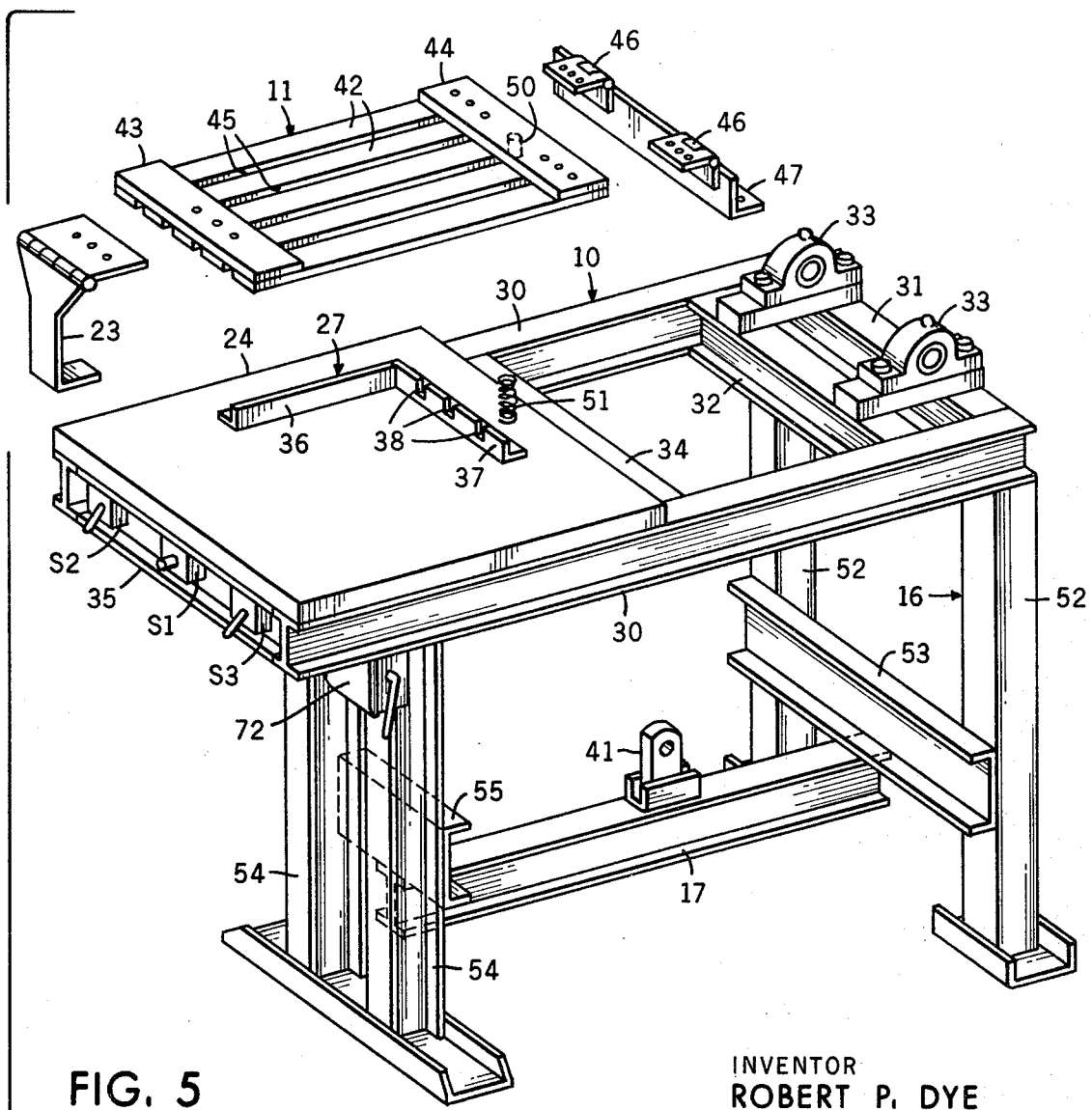
FIG. 5 is a perspective view of the table and stripper assembly only, the stripper assembly being exploded.
Figure 6:
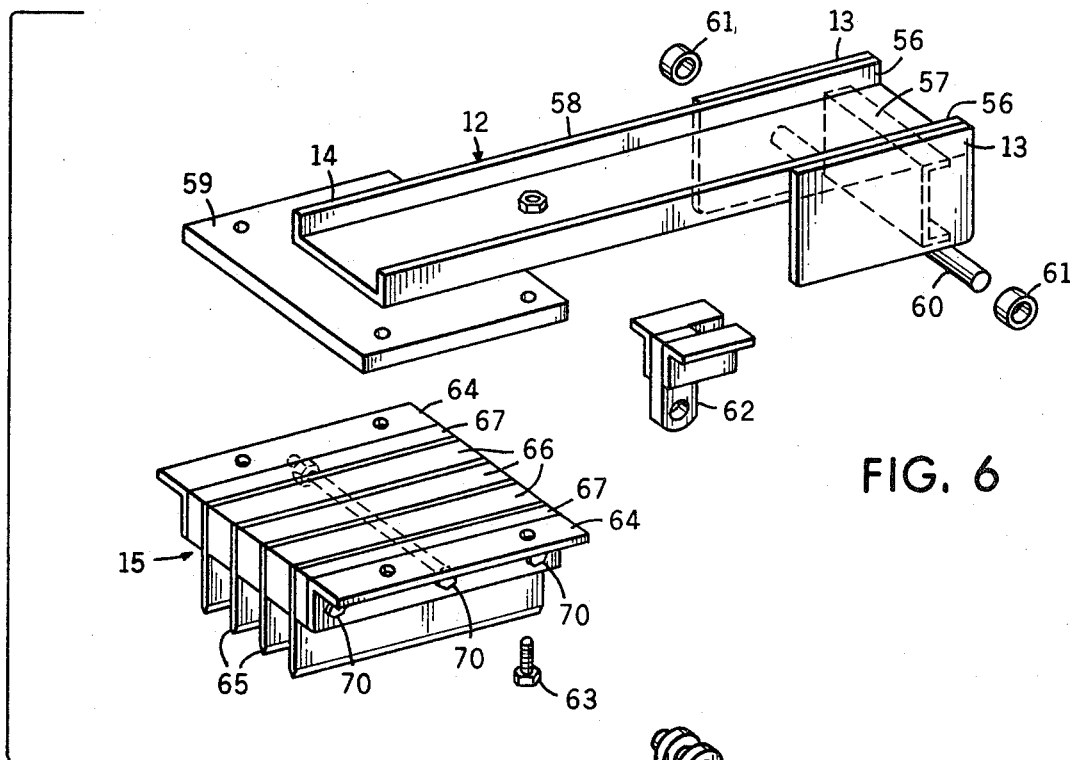
FIG. 6 is an exploded view in perspective of the blade assembly and the pivoted support arm.

FIG. 5 illustrates the table assembly 10, the stripper assembly 11 and the support frame 16 in greater detail. The table assembly 10 includes a pair of oppositely disposed longitudinal platform framing members 30, a pair of cross members 31 and 32 supporting oppositely disposed journal bearing blocks 33 and a pair of cross members 34 and 35. The base member 24 is supported on the longitudinal platform members 30, and the guide means 27 is attached to the base member 24.

Figure 3:
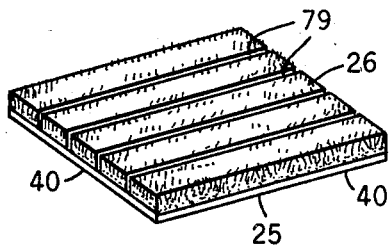
FIG. 3 is a perspective view of the cutter board carrying sod which has been cut in one direction.
Figure 4:
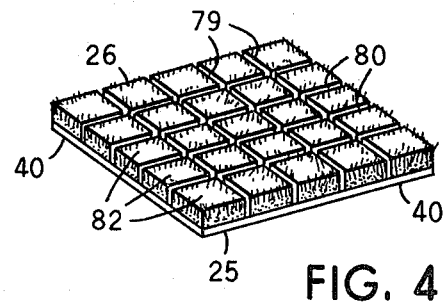
FIG. 4 is a perspective view of the same sod cut in both directions.

The guide means 27 includes adjacent angle members 36 and 37 providing a stop means positioning the cutter board 25 carrying the block of sod 26. As is clearly disclosed in FIGS. 3 and 4, the cutter board includes adjacent sides 40 which cooperate with the angle members 36 and 37 to position the block of sod 26 during the cutting process.

The male portion 41 of the lower pivotal connection of the reciprocating arm 21 is carried by the cross beam 17 of the support frame 16.

The stripper assembly 11 includes a plurality of slats 42. The slats 42, constituting fillers are detachably attached to a pair of cross bars 43 and 44 at spaced intervals to provide a plurality of substantially parallel elongate slots 45. The stripper assembly 11 is attached to the base member 24 by means of a pair of hinges 46 each of which has one leg removably attached to the cross bar 44 of the stripper assembly 11 and the other leg fixedly attached to an angle support member 47, the angle support member 47 being bolted or otherwise seated on the cross member 34. A peg 50 downwardly depending from the underside of the stripper assembly 11, coacts with a spring 51 to provide a resilient means disposed between the hinge attachment of the stripper assembly 11 and the latch member 23, the latch member 23 being hingedly and detachably attached to the cross member 43.

It will be understood that when the cutter board 25 is located in position on the table 24, the stripper assembly 11 will overlie the block of sod 26 and may be brought into clamping relation with the sod by hooking the latch 23 under the cross member 35.

The frame 16 includes a pair of rear legs 52 braced by a lateral member 53 and a pair of front legs 54 braced by a lateral member 55. The lateral members 53 and 55 carry the cross beam 17. Switches S-1, S-2 and S-3 are located on the front cross member 35. Switch S-1 is activated by the latch member 23 when the latch member 23 is operatively disposed in clamping relation to the cross member 35. The purpose of the switches will later become apparent.

The support arm 12 includes a main longitudinal member 58 having a blade assembly adaptor plate 59 at its outer end 14. At its inner end 13, the support arm 12 includes a pair of side stiffening plates 56 and a diaphragm channel 57. An axle member 60 provided with spacer washers 61, provides a means of pivotally mounting the support arm 12 in the journal blocks 33. (FIG. 5).

The male member 52 of the pivotal connection between the support arm 12 and the reciprocating arm 21, is attached as by welding to the underside of the main longitudinal member 59.

The blade assembly 15 is attached to the adaptor plate 55 by means of fasteners 63 extending between the side framing member 64 and the adaptor plate 55. The blades 65 are disposed in spaced parallel relation to each other by spacer blocks 66 and 67. Elongate removable fasteners 70 hold the blade assembly 15 together. It will be understood that each blade 65 is in register with an associated slot 45 of the stripper assembly 11 (FIG. 5).

Figure 7:
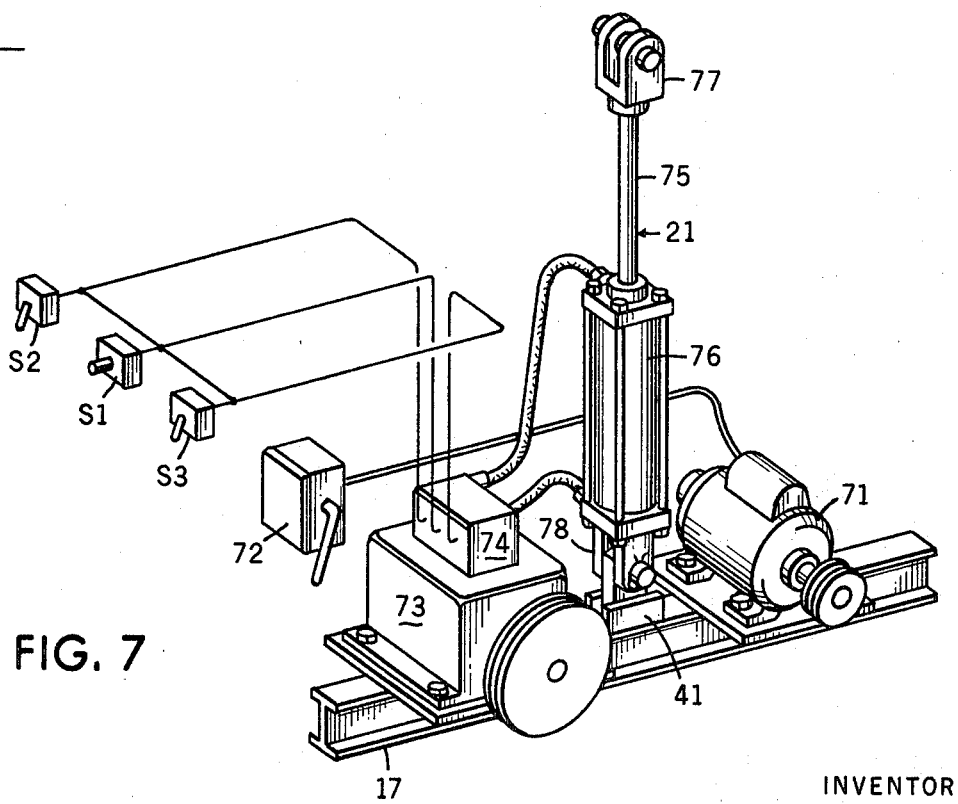
FIG. 7 is a perspective view of the reciprocating arm mechanism and the switching arrangement.

FIG. 7 illustrates the drive and switching mechanism. The cross beam 17 supports an electric motor 71 which receives its power input from the main switchbox 72. Supported on the cross beam 17 is a hydraulic pump and reservoir unit 73 which is driven by the motor 71. It will be understood that the belt drive between the motor 71 and the hydraulic unit 73 has been omitted for clarity. Mounted above the hydraulic unit 73 is a 4-way solenoid valve 74 which is controlled by switches S-1, S-2 and S-3. Switch S-1 is a safety conditioning switch, which is actuated by the latch member 23 (FIG. 5), and switches S-2 and S-3 control the reciprocating motion of the reciprocating arm 21 by actuating the 4-way solenoid 74.

The reciprocating arm 21 includes a ram 75 and a cylinder 76. Female pivotal connection members 77 and 78 are provided at opposite ends of the reciprocating arm 21 and interconnect the reciprocating arm 21 with the support arm 12 and the cross beam 17 respectively.

It is thought that the functional advantages of this sod-cutting apparaus have become fully apparent from the foregoing description of parts, but for completeness of disclosure, the operation of the apparatus will be briefly described.

The cutter board 55 simply sits on the base member 24, and may therefore be easily lifted from the table assembly and loaded with a block of sod of approximately the same size and shape as the board. The loaded cutter board 25, which can be easily handled, is placed on the base member 24, its location being determined by the guide means 27.

Because of the spring assembly 51, the stripper assembly 11 is, as may be observed in FIG. 1, in an upward position when the latch 23 is unhooked. This facilitates the placement of the loaded cutter board. The stripper assembly 11 which now overlies the block of sod 26 may be pulled down in clamped relation with the sod 26, its clamped relation being maintained by hooking the latch 23 under the cross member 35. The closing of the latch 23 actuates the switch S-1 and conditions the circuitry. By this it is meant that until switch S-1 is actuated, neither of the switches S-2 and S-3 may be operatively actuated. Thus a very effective safety device is provided: the latching arrangement requires that an operator use one hand to hold the latch 23 in position while the other hand is used for either of the switches S-2 and S-3 which actuate the drive mechanism 20 for upward or downward motion of the support arm 14 respectively. Thus the hands of an operator will be clear of the moving parts of the machine during the cutting operation.

As the reciprocating arm 21 moves downwardly the blade assembly 15 moves in a downwad direction toward the table assembly. The blades 65, which are in register with the slots 45 provided in the stripper assembly 11 pass through the slots 45 to cut the block of sod 26. This results in a plurality of parallel cuts 79 as is clearly seen in FIG. 3. It will be observed that the provision of grooves 38 in the rearwardly disposed angle member 37 of the guide means 27 permits the blades to cut the block of sod 26 along the full extent of the cutter board 25.

As the cutter blades 65 move upwardly away from the table assembly, the disengagement of the blades 65 from the block of sod 26 causes an upward pull on the stripper assembly 11 which is resisted by the latch member 23. As the blades pass from the stripper assembly 11, they are stripped of sod, and consequently are substantially clean. When the support arm 12 has moved to its upper limit and has become stationary, the latch 23 may be lifted.

Referring now to FIG. 5, it will be clear that the cutter board 25 may be pulled partly clear of the guide means, rotated through 90°, and again positioned by the guide means for a second cutting. Once the loaded cutter board 25 has been relocated, the operation proceeds as outlined above with the result that cuts 80 are provided, running perpendicular to cuts 79, as is clearly shown in FIG. 4. This crisscrossing of cuts produces a plurality of plugs 82.

The size of the plugs 82 may be varied to suit individual requirements by simply changing the number of blades 65 and using different spacer blocks 66 and 67. Of course, it will be understood that the stripper assembly 11 will have to be modified, since it is essential that the slots 45 are in register with the blades 65 because the stripper assembly 11 intercepts the path of the blades 65. This may be accomplished by either changing the number of slats 42 or by using a modified stripper assembly.

The invention has been described by making detailed reference to a single preferred embodiment, however, such detail is to be understood in an instructive rather than in a restricted sense, many variations being possible within the scope of the claims hereunto appended.

I claim as my invention:

1. An apparatus for cutting and forming grass sod into plugs, comprising:
   (a) a table means adapted to receive a block of sod,
   (b) a plurality of cutting blades selectively disposed in spaced relation from the table means,
   (c) means selectively moving the blades toward and away from the table,
   (d) stripping means adapted to overlie the block, and spaced from the table to intercept the path of the blades, the stripping means including a plurality of slots in register with the blades, the slots receiving the blades as the blades move toward the table to cut the sod, and the stripping means operatively cooperating with the blades to strip the sod from the blades as the blades move out of the slots and away from the table,
   (e) the table means including a cutter board, having adjacent sides adapted to position and support the sod below the stripping means and in the path of the blades, and
   (f) guide means including adjacent stop means that cooperate with the adjacent sides of the cutter board to position the cutter board in two locations substantially 90° out of phase with each other.

2. An apparatus for cutting and forming grass sod into plugs, comprising:
   (a) a table means adapted to receive a block of sod,
   (b) a plurality of cutting blades selectively disposed in spaced relation from the table means,
   (c) means selectively moving the blades toward and away from the table,
   (d) stripping means adapted to overlie the block, and spaced from the table to intercept the path of the blades, the stripping means including a plurality of slots in register with the blades, the slots receiving the blades as the blades move toward the table to cut the sod, and the stripping means operatively cooperating with the blades to strip the sod from the blades as the blades move out of the slots and away from the table,
   (e) spacer means separating the blades into substantially parallel spaced relation, the spacer means determining the size of the plugs cut from the sod, and
   (f) the stripping means including filler means disposed in substantially parallel spaced relation to provide the slots.

3. An apparatus for cutting and forming grass sod into plugs, comprising:
   (a) a table means adapted to receive a block of sod,
   (b) a plurality of cutting blades selectively disposed in spaced realtion from the table means,
   (c) means selectively moving the blades toward and away from the table,
   (d) stripping means adapted to overlie the block, and spaced from the table to intercept the path of the blades, the stripping means including a plurality of slots in register with the blades, the slots receiving the blades as the blades move toward the table to cut the sod, and the stripping means operatively cooperating with the blades to strip the sod from the blades as the blades move out of the slots and away from the table,
   (e) a latch disconnectably interconnecting the table means and the stripping means to retain the stripping means during the stripping action as the blades move out of the slots and away from the table.

4. An apparatus as defined in claim 3, in which:
   (f) a safety switch conditions the blades for movement, and
   (g) the latch actuates the safety switch when the latch interconnects the table means and the stripping means.

5. An apparatus as defined in claim 3, in which:
   (f) the latch interconnecting the table means and the stripping means is adapted to clamp the sod between both said means during the cutting action.

6. An apparatus for cutting and forming grass sod into plugs, comprising:
   (a) a table means adapted to receive a block of sod,
   (b) a plurality of cutting blades selectively disposed in spaced relation from the table means,
   (c) means selectively moving the blades toward and away from the table,
   (d) stripping means adapted to overlie the block, and spaced from the table to intercept the path of the blades, the stripping means including a plurality of slots in register with the blades, the slots receiving the blades as the blades move toward the table to cut the sod, and the stripping means operatively cooperating with the blades to strip the sod from the blades as the blades move out of the slots and away from the table,
   (e) the means for moving the blades including a support arm pivotally mounted to the table means, the support arm including an outer end carrying the blades.

7. An apparatus as defined in claim 6, in which:
   (f) the means for moving the blades include a reciprocating arm pivotally connected to the support arm, to operatively oscillate the pivoted support arm, whereby to move the blades toward or away from the table.

8. An apparatus as defined in claim 7, in which:
   (g) the pivotal connection of the reciprocating arm to the support arm is disposed between the pivotal mounting of the support arm and the blades, and
   (h) the table means includes a support frame, the reciprocating arm being pivotally connected to the support frame to permit the oscillation of the support arm.

9. An apparatus for cutting and forming grass sod into plugs, comprising:
   (a) a table means adapted to receive a block of sod,
   (b) a plurality of cutting blades selectively disposed in spaced relation from the table means,
   (c) means selectively moving the blades toward and away from the table,
   (d) stripping means adapted to overlie the block, and spaced from the table to intercept the path of the blades, the stripping means including a plurality of slots in register with the blades, the slots receiving the blades as the blades move toward the table to cut the sod, and the stripping means operatively cooperating with the blades to strip the sod from the blades as the blades move out of the slots and away from the table, (e) the stripping means including a pair of ends adapted to be oppositely disposed outwardly of the sod, one of said ends being hingedly attached to the table, and (f) a latch on the other of said ends, the latch interconnecting the table means and the stripping means to clamp the sod between both said means during the cutting action.

10. An apparatus as defined in claim 9, in which:

(g) resilient means is operatively connected to the stripping means, and disposed between the hinge attachment and the latch, the resilient means tending to release the clamping action of the stripping means.

11. An apparatus for cutting and forming grass sod into plugs, comprising:

(a) a table means adapted to receive a block of sod, (b) a plurality of cutting blades selectively disposed in spaced relation from the table means, (c) means selectively moving the blades toward and away from the table, (d) stripping means adapted to overlie the block, and spaced from the table to intercept the path of the blades, the stripping means including a plurality of slots in register with the blades, the slots receiving the blades as the blades move toward the table to cut the sod, and the stripping means operatively cooperating with the blades to strip the sod from the blades as the blades move out of the slots and away from the table, (e) the table means including a cutter board having adjacent sides adapted to support the sod, (f) guide means including adjacent stop means cooperating with the adjacent sides of the cutter board to position the cutter board in two locations substantially 90° out of phase with each other, (g) a latch interconnecting the table means and the stripping means to retain the stripping means during the stripping action and to clamp the sod between the stripping means and board during the cutting action, and (h) the means for moving the blades including:

(1) a support arm pivotally mounted to the table means, the support arm including an outer end carrying the blades, and (2) a reciprocating arm pivotally connected to the support arm operatively to oscillate the support arm and thereby move the blades toward or away from the table.

12. An apparatus as defined in claim 11, in which:

(i) a safety switch conditions the blades for movement, and (j) the latch actuates the safety switch when the latch interconnects the table means and the stripping means.

13. An apparatus as defined in claim 11, in which:

(i) the pivotal connection of the reciprocating arm to the support arm is disposed between the blades and the pivotal mounting of the support arm.

References Cited

UNITED STATES PATENTS

| | | | |
|---|---|---|---|
| 731,188 | 1/1903 | Jackson | 83—146 |
| 1,360,033 | 11/1920 | Seitzman | 83—145 |

WILLIAM S. LAWSON, Primary Examiner

U.S. Cl. X.R.

83—399, 453, 459, 607, 620, 925